May 3, 1966 C. E. ANSTEY ETAL 3,249,744

DIGITAL RATIO CONTROL DEVICE

Filed May 3, 1962

INVENTOR.
CHARLES E. ANSTEY
JOHN PAUL JONES

BY Jacob Trachtman
ATTORNEY

United States Patent Office 3,249,744
Patented May 3, 1966

3,249,744
DIGITAL RATIO CONTROL DEVICE

Charles E. Anstey, West Chester, and John Paul Jones, Wynnewood, Pa., assignors to Navigation Computer Corporation, Norristown, Pa., a corporation of Pennsylvania Filed May 3, 1962, Ser. No. 192,227
38 Claims. (Cl. 235—152)

The invention relates to digital ratio control devices, and more particularly, to digital devices which are adjustable for controlling the ratio of output to input pulses.

Heretofore, digital ratio control devices have been provided utilizing a plurality of counters and other such electronic devices. Such devices have been complex and have required numerous components, materially increasing their cost. Where, for example, four output pulses are to be delivered for every 1,000 input pulses, prior art devices have required that the 4 pulses be delivered in sequence after the occurrence of 1,000 pulses, rather than providing a distributed averaged output of 1 pulse for every 250 input pulses.

It is, therefore, an object of the invention to provide a new and improved digital ratio control device which is highly accurate and inexpensive to produce.

Another object of the invention is to provide a new and improved digital ratio control device utilizing a scanned record means to provide a simplified device of high accuracy.

Another object of the invention is to provide a new and improved digital ratio control device providing for the averaged distribution of output pulses over the period during which input pulses are received in accordance with the predetermined ratio of input to output pulses.

Another object of the invention is to provide a new and improved digital ratio control device which may readily and accurately have the ratio of output to input signals adjusted.

Another object of the invention is to provide a new and improved digital ratio control device providing for linear or nonlinear control of the ratio adjustment depending upon the particular design circumstances.

Another object of the invention is to provide a new and improved digital ratio control device which may readily be maintained and repaired.

The above objects, as well as many other objects of the invention, are achieved by providing a digital ratio control device comprising a source of pulse signals, gating means receiving pulse signals from the source and being controlled by gating signals. A control means is provided which includes a scanning means for producing the gating signals to the gate means. The gating signals condition the gate means during alternate first and second intervals to respectively transmit and inhibit transmission of pulse signals from the source of pulse signals.

The scanning means has a record means and detecting means positioned for deriving signals from the record means. The scanning means also includes means for adjusting the position of the detecting means with respect to the record means for setting the value of the ratio of the first interval to the sum of the first and second intervals.

In particular, the record means may be a rotating disc body having a record surface perpendicular to the axis of rotation, while the detecting means is a magnetic reading head positioned proximate to the record surface for deriving signals therefrom. The radial position of the head with respect to the record surface is adjusted for setting the value of the ratio of the first interval to the sum of the first and second intervals.

The record surface of the rotating body is provided with magnetic and nonmagnetic regions which are read by the head and arranged as a function of radial position. In this manner, the output signal from the head is a continuous function of the radial position of the head and continuously varies the setting of the value of the ratio of the first interval to the sum of the first and second intervals. The record surface may be provided with magnetic and nonmagnetic regions arranged so that the setting of the ratio is a linear or nonlinear function of the radial position of the reading head, as required by particular design circumstances. In fact, nonlinearities in the system may be offset by complementary nonlinearities provided by the record surface for a resultant linear operation or operation in accordance with other such design requirements.

A cylindrical rotating record body with a cylindrical record surface may also be utilized, as well as many other such configurations. In place of magnetic and nonmagnetic regions of the record body for providing periodic signals which are a function of position in the axial direction, the detecting means may comprise a photoelectric cell and the record body may have light transmitting and nontransmitting areas for deriving the periodic information signal.

Of course, the reflecting and any other such properties of a rotating record body may be used for providing the required periodic information as a function of position of the appropriate detecting means.

The foregoing and other objects of the invention will become more apparent as the following detailed description of the invention is read in conjunction with the drawings, in which.

Like numerals designate like parts throughout the several views.

Figures 1, 2, 3, 4:
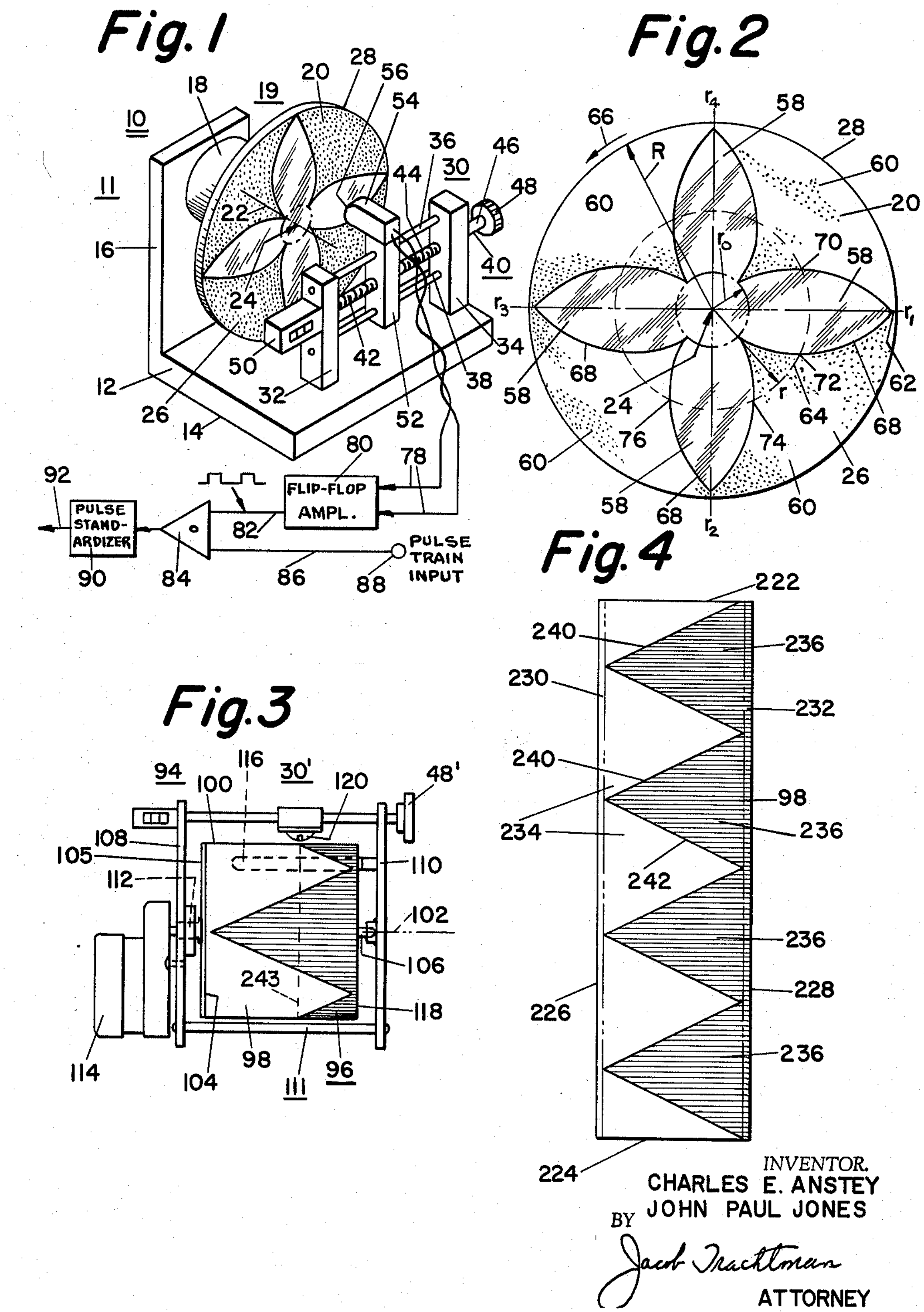
FIGURE 1 is a perspective view of a digital ratio control device embodying the invention with a portion shown schematically.
FIGURE 2 is an enlarged plan view of the record body illustrating its record surface shown in FIGURE 1.
FIGURE 3 is a front elevational view of a modified form of the invention shown in FIGURE 1.
FIGURE 4 is a plan view of the layout of the cylindrical record surface of the record body shown in FIGURE 3.

Refer to FIGURES 1 and 2 which disclose a digital ratio control device 10 embodying the invention.

The digital ratio control device 10 has a control means 11 provided with supporting means 12 comprising a horizontal base 14 with an extending vertical wall 16. A drive motor 18 of a scanning means 19 is supported by the wall 16 with its rotor extending in a horizontal direction. The rotor of the motor 18 is secured with a record disc body 20. The body 20 is thus secured for rotation about a horizontal axis 22 extending through its center 24. The record surface 26 of the body 20 lies within a vertical plane perpendicular to the axis of rotation 22 and has a circular edge 28.

The motor 18 is constant speed or synchronous type of motor for revolving the body 20 about its axis at a substantially constant average angular velocity.

The scanning means 19 is also provided with a detecting means 30 which is mounted by the support blocks 32, 34 upon the base 14. The blocks 32, 34 are connected by a pair of parallel vertically aligned guide bars 36, 38 of a detector positioning means 40. The means 40 also includes a screw rod 42 provided with a threaded portion 44 extending intermediate the blocks 32, 34 in parallel space relationship to the guide rods 36, 38. The extending end 46 of the screw rod 42 is provided with an adjustment knob 48 for rotating the screw rod 42, while its other end is supported by the block 32 and coupled to a count indicator 50. The count indicator 50 shows the number of revolutions made by turning the knob 48 of the screw means 42 or may be calibrated to show the set ratio of output to input pulse signal of the device 10.

A carriage block 52 of the scaning means 19 is provided with a pair of openings slidably receiving therethrough the guide rods 36, 38 of the detector positioning means 40, while threadedly receiving therethrough the threaded portion 44 of the screw rod 42. The carriage 52 supports at its top a signal detecting device or magnetic reading head 54. The sensing end 56 of the reading head 54 is positioned proximate to the record surface 26 of the body 20 deriving periodic information from the record surface 26. Rotation of the knob 48 of the screw rod 42 causes the end 56 of the head 54 to move along a horizontal line which is in a horizontal plane passing through the center 24 of the record body 20. The rotation of the knob 48 thus adjusts the radial position of the reading head 54 with respect to the center of the rotating body 20. The radial position of the head 54 is accurately related to and may be indicated by the reading provided by the counter 50 since its reading is proportional to the rotations of the detector positioning means 40.

FIGURE 2 shows the record surface 26 of the record body 20 in greater detail. Information is recorded on the surface 26 of the record body 20 by providing a plurality of regions 58 having conducting surfaces and intermediate regions 60 which are provided with nonconducting or electrical insulator surfaces. Thus, if the body 20 is formed of an insulator material, the conducting surfaces 58 may be provided by depositing or applying a conductive metallic material within the regions 58. Of course, this result may be achieved and provided by other similar means.

The record surface 26 particularly illustrated, is provided with four regions 58 which are identical to each other and equally angularly spaced about the center 24 of the record surface 26. Each of the regions 58 is provided with a boundary forming a configuration which is symmetrical about its particular radius of symmetry $r_1$, $r_2$, $r_3$, and $r_4$. For practical reasons in deriving signals by the head 54, a central hub is provided having a radius $r_0$, while the outer radius R of the surface 26 provides a marginal space with the outermost end 62 of the conducting regions 58.

In operation, when the head 54 is positioned at a radial distance $r$ from the center 24 of the record surface 26, it will scan a path on the record surface 26 shown by the dashed lines 64. Thus, if the body 20 is turning in the counterclockwise direction as shown by the arrow 66, the scanning path of the head 54 will be in the clockwise direction over the record surface 26. As the head crosses the boundary 68 into the region 58 at point 70, it will derive a pulse signal which will be followed by a second pulse signal when it crosses the boundary 68 at point 72 going from the conducting to nonconducting region 60. The next pulse provided by the head 54 occurs when it crosses the boundary 68 at point 74 passing from the nonconducting to conducting region 58 followed by the signal derived in crossing the boundary 68 at point 76 going from the conducting to nonconducting region 60. Thus, a pulse is derived by the head 54 each time the head crosses the boundaries 68 of the regions 58.

Since the regions 58 are identical, the time elapsed between crossing the correspondingly similar boundaries of the regions 58, such as at points 70 and 74, is a constant time interval, while the time when the signal is derived by the signal head 54 when it crosses the boundary 68 at point 72 with respect to the crossing points 70 and 74 is a function of the radius $r$ or radial displacement of the head 54 with respect to the center 24 of the record body 26.

Of course, the configuration of the regions 58 may be provided with consideration to the particular design circumstances and requirements for which the device 10 is to be utilized.

The configuration of the regions 58 illustrated by the body 20 in FIGURE 2 provides a ratio of the output to input pulses to the device 10 which is a substantially linear function of the radial position of the head 54 with respect to the center 24 of the record surface 26 of the body 20. To provide such a substantially linear relationship, the boundary 68 of the conducting region 58 approximates the following formulation:

$$\theta = \pm \frac{\pi r_n / N}{m(r_n - r_o) + 1},\ r_n \geq r_o$$

where $\theta$ is in radians measured from the radius $r_n$, N is the number of regions 58, $r_n$ is the radial distance along the $n$th radius of symmetry of the regions 58 where $n$ goes from one to N, and $r_o$ and $m$ are constants.

Although four regions 58 have been illustrated by the recording surface 26 of FIGURE 2, a recording surface may be provided with different numbers of regions 58 from that disclosed.

As will be seen below, a symmetrical arrangement of the radially displaced regions 58 will tend to correct for any misalignment or variations in the center 24 of the record surface 26 with respect to the radial position of the head 54 when in a set position with respect to the supporting means 12. This is due to the linear relationship involved in the displacement of the reading head.

The periodic signals derived by the reading head 54 are delivered over the lines 78 to a flip-flop amplifier circuit 80 of conventional construction which has first and second states. Upon the receipt of each signal over the lines 78, the amplifier 80 is actuated from the state that it is in to the other state. When it is in its first state, the amplifier 80 delivers a signal over line 82 conditioning the gate 84 for transmitting pulse signals received over line 86 from a pulse input terminal 88. A train of pulse signals having a predetermined repetition rate exceeding the rate of the gating signals is delivered to the terminal 88.

When the amplifier 80 is in its second state, its output signal on line 82 inhibits the gate 84 from passing the signals delivered to the terminal 88. The signals delivered by the output of gate 84 are received by a pulse standardizer 90. The pulse standardizer, may be a one shot multivibrator of the type well known in the art which, upon receiving an impulse having a predetermined minimum amplitude and duration, delivers a pulse on its output line 92 having a predetermined standard amplitude and duration.

In operation, as the reading head 54 scans the record surface 26 of the rotating body 20, it delivers output pulse signals as its reading path crosses a boundary going from an insulator to conductor region 58 which sets the amplifier 80 to its first state. The amplifier 80 provides a gating signal to the gate 84, allowing the pulses received by terminal 88 to be passed to the standardizer 90 which provides corresponding output pulses on its output line 92. The gate 84 will continue to pass pulses to the standardizer 90 until the head 54 crosses the boundary of the region 58 passing from the conducting to nonconducting region 60. At this time a pulse is delivered to the amplifier 80 placing it in its second state inhibiting the gate 84. The pulses received by the terminal 88, thus, will not be passed to the standardizer 90 until the reading head again passes from the nonconducting to the conducting surface of the region 58 when the gate 84 is again conditioned for passing the pulse signals from terminal 88 to the standardizer 90.

Since the amplifier 80 may be set from its first to second states or returned from its second to its first state during the appearance of a pulse at terminal 88, the standardizer 90 serves to provide an output pulse on line 92 either of standard form or it will provide no pulse at all, depending upon the fraction of the pulse which is passed by the gate 84. This operation of the standardizer 90, in addition to providing standard output pulses, also provides for the averaging or distributing with average uniformity the output signals provided by the device 10, which will be further described below.

The gate 84, as affected by the gating signal from the amplifier 80, will deliver signals from the terminal 88 during a first interval of time, while preventing the delivery of signals during the subsequent second time interval. In this manner, of the pulse signals delivered to the input terminal 88 during the first and second intervals provided by flip-flop amplifier 80, signals will be passed to the standardizer 90 and its output line 92 only during the first interval. The ratio of output signals on line 92 to input signals received by the terminal 88 is thus controlled by the ratio of the first interval to the sum of the first and second intervals provided by the flip-flop amplifier 80. The ratio will increase directly as the increase in the time of the first interval. The duration of the first interval is controlled by the first signal placing amplifier 80 in its first state and the subsequent signal returning it to its second state. These signals are provided by the head 54 as the path of the head 54 crosses the boundary into the region 58 and crosses the boundary out of the region 58 of the record body. Thus, duration of the first interval is determined by the length of the scanning path of the head 54 within the region 58. As evident from FIGURE 2, the path within the region 58 is a function of the radial displacement of the head 54 from the center 24 of the body 20 and increases as the radius *r* is reduced. With the counter 50 coupled to the detector positioning means 40, the reading of the counter 50 may be used to directly indicate the ratio of the output to the input signals of means 10. The ratio may be continuously and accurately adjusted by rotating the knob 48 of the positioning means 40.

A particular advantage of the device 10 inheres in the averaging or distributing with average uniformity of the output signals provided thereby. Such result is achieved by utilizing the standardizer 90 which allows for the receipt of a fraction of a pulse by the standardizer and its delivery of a standard output pulse. Since the intervals during which the pulses are received through the gate 84 may be continuously varied and set, the gating period is not necessarily a multiple of the pulse rate of the signals received on the pulse input terminal 88. Thus, for example, if the ratio is set so that 4 pulses are to be delivered on the output line 92 of the device 100 for each 1,000 pulses received at the input terminal 88, then the averaging operation of the device will provide for the delivery of 4 pulse signals during the occurrence of 1,000 input signals. The 4 output signals are distributed with average uniformity over the time of occurrence of 1,000 input pulses so that on the average, one output pulse will be provided for each 250 input pulses.

This result is highly important where the device 10 is used for controlling the proportion or percentage of a material being added to one or more other materials, since this allows for even distribution and mixing of components providing better results especially when small percentages are to be added. The even distribution of pulses also reduces the error in the proportioning of such substances, since where an error feedback system is utilized, the error may be continuously corrected and minimized. Of course, the provision of 4 pulses in sequence and not spaced or averaged over the entire interval, decreases the accuracy in the adding of such a constituent and provides greater difficulty in minimizing the error in blending due to its nonaveraged distribution.

It is also noted that with a particular symmetric arrangement of the conducting areas 58 of the record surface 28 of the record body 20, an off center displacement of the center 28 with respect to the path 64 of the reading head 54 will, on the average, not affect the average accuracy of the digital ratio control device. This is apparent from the fact that because of the linear relationship described, the reduction of the time of the path within a conducting region 58 due to an off center condition of the body rotation axis, will result in the proportional increase in the length of time for the path through the radially opposite region 58 of the record surface 26.

Of course, although the regions 58 and 60 differ by having conducting and nonconducting surfaces, information may be provided by the recording disc by having light transmitting and nontransmitting regions. In that case, the detecting means may be a photocell and a light source may be positioned to pass light through the light transmitting portion of the record body for detection by the scanning action of the photocell.

Refer now to FIGURES 3 and 4 which disclose a digital ratio control device 94 which is a modification of the device 10 shown in FIGURE 1. The device 94 differs mainly from the device 10 of FIGURE 1 by providing a cylindrical record body 96, so that only the differences will be described below in detail.

The record body 96 of device 94 has a substantially right circular cylindrical form with its outer surface provided by a cylindrical record sheet 98 providing lines 100 formed by the intersection with a plane including the axis of rotation 102. The body 96 has an end 104 which is attached to and enclosed by a supporting wall 105 which secures the body 96 with an axle 106. The axle 106 is pivotally retained at its ends by the vertical supporting members 108, 110 of the base 111 for rotatably mounting the body 96. The axle 106 is linked at one end with the drive means 112 of a constant speed or synchronous motor 114 for rotating the body 96 with a constant average angular velocity.

A light source 116 is supported by the vertical member 110 and extends through the open end 118 of the body 96 proximate to the inner surface of the record sheet 98 of the cylinder 96. A detector 120, which may be a photoelectric cell, is positioned proximate to the outer surface of the record sheet 98 and is provided with a detector positioning means 30' substantially similar to the positioning means 30 of FIGURE 1. The positioning means 30', by rotation of the knob 48', causes the displacement of the detector 120 along the axial direction proximate the outer surface of the record sheet 98, for detecting periodic signals.

Refer to FIGURE 4 which is a plan layout view of the outer surface of the record sheet 98.

The top and bottom edges 122, 124 are joined to provide the cylindrical form shown in FIGURE 3, while the side edges 226, 228 provide the ends 104, 118 of the body 96. For practical reasons, marginal strips 230, 232 are provided along the edges 226, 228 so that the detector 120 may provide accurate readings.

The record sheet 98 is provided with a plurality of triangular regions 234 which transmit light therethrough, and a plurality of triangular regions 236 which do not transmit light therethrough. This may be achieved by masking a translucent sheet material or by other means well known to the art. The regions 234 and 236 are defined and separated by a saw tooth marginal line 240 which extends between the marginal regions 230 and 232 and proceeds from the top edge 222 to the bottom edge 224 of the record sheet 98. The areas 234, 236 have the form of isosceles triangles and are congruent to each other. Thus, the upper side 240 of the triangular region 236 has a positive slope with respect to the horizontal axis 102 which is equal to the negative value of the slope of the lower side 242 of the region 236. The triangular regions 234, 236 are thus symmetrically positioned with respect to the horizontal axis 102 of rotation. The angle at which the detecting means 120 crosses the boundary 240, 242, as indicated by the scanning path shown by the dashed lines 243 of FIGURE 3, is uniform, thereby tending to increase the accuracy of the device 94 in deriving output signals from the detector 120.

The time during which the detector 120 derives light from the source 116 is a function of its displacement along the direction of the axis 102. For the particular record means 98, the period during which the detector 120 receives the light signal through the record sheet 98 varies linearly with respect to its position with respect to the record body 96 along the axial direction. The output pulses derived from the detector 120, as controlled by the positioning means 30', are similarly delivered to the flip-flop amplifier 80 and its accompanying circuitry shown in FIGURE 1 for providing the set ratio of output pulses on line 92 to the input pulses delivered to the terminal 88.

The record sheet 98 may also be provided with conducting or nonconducting areas and the detector 120 may be a magnetic pickup head for providing the output periodic timing signals and the device 10 of FIGURE 1.

The digital ratio control device 10 and the modified device 94 described and illustrated herein provide highly simplified devices achieving the results which have heretofore been produced by complex and numerous electrical pulse counting devices. The disclosed means is highly reliable and is not expensive to manufacture, may easily be maintained in operative condition, and may readily be repaired.

The record means disclosed provides for a control means which readily adjusts the ratio of output signals to input signals, while the record means allows the versatility of providing a linear or nonlinear relationship between the position of the detecting means with respect to the record body and the ratio of output to input signals of the device. The accuracy of the control means setting can also be varied by changing the size and proportions of the record body, thereby also increasing the scope and applicability of the device to particular design requirements.

It will, of course, be understood that the description and drawings, herein contained, are illustrative merely, and that various modifications and changes may be made in the structure disclosed without departing from the spirit of the invention.

What is claimed is:

1. A digital ratio control device comprising a source of pulse signals, gate means receiving pulse signals from said source and being controlled by gating signal for providing a predetermined ratio of transmitted to received signals, and control means providing first and second gating signals to said gate means for respectively conditioning said gate means during alternate first and second time intervals to respectively transmit during said first interval and inhibit during said second interval the transmission of pulse signals from said source with the ratio of said first interval to the sum of said first and second intervals having a predetermined substantially constant value.

2. The device of claim 1 in which said control means includes adjusting means for setting the value of the ratio of said first interval to the sum of said first and second intervals.

3. The device of claim 2 in which said gate means provides output pulse signals with the average ratio of said output pulse signals to said pulse signals delivered to said gating means having said predetermined value.

4. The device of claim 3 including a pulse forming means receiving the output pulse signals of said gate means and providing an identical output pulse signal for each output pulse signal received from said gate means having a predetermined minimum amplitude and duration.

5. A digital ratio control device comprising a source of pulse signals, gate means receiving pulse signals from said source and being controlled by gating signal for providing a predetermined ratio of transmitted to received signals, and scanning means providing periodic first and second gating signals to said gate means for respectively conditioning said gate means during alternate first and second time intervals to respectively transmit during said first interval and inhibit during said second interval the transmission of pulse signals from said source with the ratio of said first interval to the sum of said first and second intervals having a predetermined substantially constant value.

6. The device of claim 5 in which said scanning means includes a record means and a detecting means positioned for deriving signals from said record means.

7. The device of claim 6 in which said scanning means includes control means for adjusting the position of said detecting means with respect to said record means for setting the value of the ratio of said first interval to the sum of said first and second intervals.

8. The device of claim 7 in which said control means of said scanning means provides for continuously adjusting the position of said detecting means with respect to said record means for continuously adjusting the setting of the value of the ratio of said first interval to the sum of the said first and second intervals.

9. The device of claim 7 in which the detector is a magnetic reading head and the record means is a moving body containing recorded periodic information, and said control means adjusts the position of said head with respect to said body for controlling the information read by said head and the value of the ratio of said first interval to the sum of said first and second intervals.

10. The device of claim 9 in which said moving body rotates about an axis and its surface comprises areas having dissimilar magnetic properties.

11. The device of claim 10 in which said record body provides a record surface perpendicular to the axis of rotation, said reading head being positioned proximate to said record surface for deriving signals therefrom, and said control means adjusts the radial position of said head with respect to said record surface for setting the value of the ratio of said first interval to the sum of said first and second intervals.

12. The device of claim 11 in which the record surface of said record means is provided with magnetic and nonmagnetic regions read by said head arranged as a function of radial position to provide an output signal by said head which is a continuous function of the radial position of said head to continuously vary the setting of the value of the ratio of said first interval to the sum of said first and second intervals.

13. The device of claim 12 in which the setting of the ratio of said first interval to the sum of said first and second intervals by said control means is a linear function of the radial position of said head with respect to said record means.

14. The device of claim 13 in which said record means includes a plurality of magnetic regions on its record surface extending radially from its axis for being transversely scanned by said head along a substantially circular path.

15. The device of claim 14 in which said magnetic regions are arranged on the record surface of said record means in pairs extending in radially opposite directions.

16. The device of claim 15 including pulse forming means receiving the output pulse signals of said gate means and providing an identical output pulse signal for each output pulse signal received from said gate means having a predetermined minimum amplitude and duration.

17. The device of claim 10 in which said record body provides a cylindrical record surface, said reading head being positioned proximate to said record surface for deriving signals therefrom, and said control means adjusts the axial position of said head with respect to said record surface for setting the value of the ratio of said first interval to the sum of said first and second intervals.

18. The device of claim 17 in which the record surface of said record means is provided with magnetic and nonmagnetic regions read by said head arranged as a function of axial position to provide an output signal by said head which is a continuous function of the axial position of said head to continuously vary the setting of the value of the ratio of said first interval to the sum of said first and second intervals.

19. The device of claim 18 in which the setting of the ratio of said first interval to the sum of said first and second intervals by said control means is a linear function of the axial position of said head with respect to said record means.

20. The device of claim 19 in which said record means includes a plurality of magnetic regions each of substantially triangular form on its record surface extending axially and space circumferentially from each other for being sequentially transversely scanned by said head along a substantially circular path.

21. The device of claim 19 including pulse forming means receiving the output pulse signals of said gate means and providing an identical output pulse signal for each output pulse signal received from said gate means having a predetermined minimum amplitude and duration.

22. A digital ratio control device comprising a source of pulse signals, gate means receiving pulse signals from said source and being controlled by gating signals for providing a predetermined ratio of transmitted to received signals, and scanning means providing periodic first and second gating signals to said gate means for respectively conditioning said gate means during alternate first and second time intervals to respectively transmit during said first time interval and inhibit during said second time interval the transmission of pulse signals from said source with the ratio of said first interval to the sum of said first and second intervals having a predetermined substantially constant value, said scanning means including a record means provided with light transmitting an dnontransmitting record regions, a source of light positioned on one side of said record means and a light detecting means positioned on the other side of said record means for scanning the record regions of said record means for providing said periodic gating signals.

23. The device of claim 22 in which said scanning means includes control means for adjusting the position of said detecting means with respect to said record means for setting the value of the ratio of said first interval to the sum of said first and second intervals.

24. The device of claim 23 in which said detector is a photoelectric cell and said record means is a moving body containing periodic information and said control means adjusts the position of said photoelectric cell with respect to said body for controlling the information read by said detecting means and the value of the ratio of said first interval to the sum of said first and second intervals.

25. The device of claim 24 in which said record body is a plane disc rotating about an axis and said photoelectric cell is positioned proximate said record body for deriving signals therethrough, and said control means adjusts the radial position of said photoelectric cell with respect to said record body.

26. The device of claim 25 in which the output signal from said detecting means is a linear function of the radial position of said photoelectric cell with respect to said record means.

27. The device of claim 26 including pulse forming means receiving the output pulse signals of said gate means and providing an identical output pulse signal for each output pulse signal received from said gate means having a predetermined minimum amplitude and duration.

28. The device of claim 24 in which said record body has a hollow cylindrical form with a cylindrical record surface, and said photoelectric cell is positioned proximate said record body for deriving signals therethrough, and said control means adjusting the axial position of said photoelectric cell with respect to said record body.

29. The device of claim 28 in which the output signal from said detecting means is a linear function of the axial position of said photoelectric cell with respect to said record means.

30. In a digital ratio control device, a scanning means including a rotating record means having recorded information, a detecting means positioned with respect to said record means for continuously deriving periodic recorded information and regularly delivering periodic output gating signals, and control means for continuously adjusting the position of said detecting means with respect to said record means for correspondingly continuously varying the duration of the periodic output signals of said detecting means.

31. The means of claim 30 in which said record means has information recorded thereon as a predetermined function of position, said detecting means deriving periodic recorded information and providing periodic gating pulse signals having a duration which is a continuous function of the position of said detecting means with respect to said record means.

32. The means of claim 31 in which the duration of the gating pulse signals provided by said detecting means is a continuous linear function of the position of said detecting means with respect to said record means.

33. The means of claim 32 in which said record means includes a rotating body providing a cylindrical record surface having regions with different magnetic properties for recording information, and said detecting means includes a magnetic reading head positioned proximate to the surface of said rotating body, and said control means continuously adjusts the axial position of said head with respect to the record surface of said body, the information recorded upon said body being a continuous function of displacement in the axial direction along said record surface.

34. In a digital ratio control device, a scanning means including a rotating record means having recorded information, a detecting means positioned with respect to said record means for continuously deriving periodic recorded information and regularly delivering periodic ouput gating signals, and control means adjusting the position of said detecting means with respect to said record means for controlling the duration of the periodic output signals of said detecting means, said record means having information recorded thereon as a predetermined function of position, said detecting means deriving periodic recorded information and providing periodic gating pulse signals having a duration which is a function of the position of said detecting means with respect to said record means, the duration of the gating pulse signals provided by said detecting means being a linear function of the position of said detecting means with respect to said record means, said record means being a rotating disc having a record surface perpendicular to its axis of rotation and having regions with different magnetic properties for recording information, and said detecting means including a magnetic reading head positioned proximate to the surface of said rotating disc, and said control means adjusts the radial position of said head with respect to said disc, the information recorded upon said disc being a function of radial displacement from the axis of rotation of said disc.

35. In a digital ratio control device, a scanning means including a rotating record means having recorded information, a detecting means positioned with respect to said record means for continuously deriving periodic recorded information and regularly delivering periodic output gating signals, and control means adjusting the position of said detecting means with respect to said record means for controlling the duration of the periodic output signals of said detecting means, said record means having information recorded thereon as a predetermined function of position, said detecting means deriving periodic recorded information and providing periodic gating pulse signals having a duration which is a function of the position of said detecting means with respect to said record means, the duration of the gating pulse signals provided by said detecting means being a linear function of the position of said detecting means with respect to said record means, said record means being a rotating disc having a record surface perpendicular to its axis of rotation provided with light transmitting and nontransmitting record regions, and said detecting means including a source of light positioned on one side of said disc and a light detecting device positioned on the other side of said disc for scanning the record regions of said disc, said control means adjusting the radial position of said light detecting device with respect to said disc, the information recorded upon said disc being a function of radial displacement from the axis of rotation of said disc.

36. In a digital ratio control device, a scanning means including a rotating record means having recorded information, a detecting means positioned with respect to said record means for continuously deriving periodic recorded information and regularly delivering periodic output gating signals, and control means adjusting the position of said detecting means with respect to said record means for controlling the duration of the periodic output signals of said detecting means, said record means having information recorded thereon as a predetermined function of position, said detecting means deriving periodic recorded information and providing periodic gating pulse signals having a duration which is a function of the position of said detecting means with respect to said record means, the duration of the gating pulse signals provided by said detecting means being a linear function of position of said detecting means with respect to said record means, said record means including a rotating record body having a hollow cylindrical form with a cylindrical record surface provided with light transmitting and non transmitting record regions, said detecting means including a source of light positioned on one side of said record regions of said body and a light detecting device positioned on the other side of said record regions for scanning the record regions of said body, and said control means adjusting the axial position of said light detecting device with respect to the record surface of said body, the information recorded upon said body being a function of displacement in the axial direction along said record body.

37. In a digital ratio control device, a disc record body for continuous rotation with constant angular velocity about an axis having a record surface perpendicular to its axis of rotation comprising first and second regions for periodic sensing by a detecting means for producing periodic gating pulse signals, said record surface having a predetermined boundary between said first and second regions, said first and second regions comprising a plurality of radially symmetric regions defined by the boundaries given approximately by $$\theta = \pm \frac{\pi r_n / N}{m(r_n - r_o) + 1} r_n \geq r_o$$

where $\theta$ is in radians measured from the radius $r_n$, N is the number of first regions, $r_n$ is the radial distance along the $n$th radius of symmetry of the first regions where $n$ goes from 1 to N, and $r_o$ and $m$ are constants.

38. In a digital ratio control device, a disc record body for continuous rotation with constant angular velocity about an axis having a record surface perpendicular to its axis of rotation comprising first and second regions for periodic sensing by a detecting means for producing periodic gating pulse signals, said record surface having a predetermined boundary between said first and second regions, the first and second regions differing from each other by having conducting and nonconducting record surfaces.

References Cited by the Examiner

UNITED STATES PATENTS

| | | | |
|---|---|---|---|
| 2,712,898 | 7/1955 | Knutsen | 340—146.2 |
| 2,775,727 | 12/1956 | Kernahan et al. | 235—154 |
| 2,820,157 | 1/1958 | Rieke | 307—132 |
| 2,963,222 | 12/1960 | Allen | 235—160 |
| 2,985,872 | 5/1961 | Beltrami | 340—347 |
| 3,021,062 | 2/1962 | Steele | 235—152 |

ROBERT C. BAILEY, *Primary Examiner*.

MALCOLM A. MORRISON, *Examiner*.

M. A. LERNER, *Assistant Examiner*.